US012587491B1

(12) United States Patent
Gangam et al.

(10) Patent No.: US 12,587,491 B1
(45) Date of Patent: Mar. 24, 2026

(54) NETWORK SWITCH FOR INTERCONNECTING COMPUTING DEVICES

(71) Applicant: Auradine, Inc., Santa Clara, CA (US)

(72) Inventors: Srinivas Gangam, Santa Clara, CA (US); Ashwin Alapati, Santa Clara, CA (US); Amit Srivastava, Santa Clara, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 19/082,875

(22) Filed: Mar. 18, 2025

(51) Int. Cl.
| | |
|---|---|
| *H04L 49/15* | (2022.01) |
| *H04L 49/00* | (2022.01) |
| *H04L 69/22* | (2022.01) |

(52) U.S. Cl.
CPC .............. *H04L 49/15* (2013.01); *H04L 49/30* (2013.01); *H04L 69/22* (2013.01)

(58) Field of Classification Search
CPC .......... H04L 49/15; H04L 49/30; H04L 69/22
See application file for complete search history.

(56) References Cited

U.S. PATENT DOCUMENTS

| | | | | |
|---|---|---|---|---|
| 2016/0337726 | A1* | 11/2016 | Yan | .................... H04Q 11/0003 |
| 2018/0052793 | A1* | 2/2018 | Fang | .................... G06F 13/385 |

| | | | | |
|---|---|---|---|---|
| 2021/0266346 | A1* | 8/2021 | Gordon | .............. H04L 63/0245 |
| 2022/0038384 | A1* | 2/2022 | Navon | ................ H04L 47/6275 |
| 2023/0020114 | A1* | 1/2023 | Kommula | .............. H04L 45/20 |
| 2023/0403233 | A1* | 12/2023 | Rahman | ............. H04L 49/9047 |
| 2024/0080337 | A1* | 3/2024 | Matefi | .................... G06N 20/00 |
| 2024/0257262 | A1* | 8/2024 | Matthews | .............. H04L 41/00 |
| 2025/0068457 | A1* | 2/2025 | Carranza | ................ G06V 10/94 |
| 2025/0086129 | A1* | 3/2025 | Iyer | ......................... G06F 13/28 |
| 2025/0110926 | A1* | 4/2025 | Li | ......................... G06F 16/178 |
| 2025/0199988 | A1* | 6/2025 | Hyatt | ................. G06F 13/4004 |
| 2025/0202840 | A1* | 6/2025 | Hyatt | ................... H04L 49/254 |

* cited by examiner

*Primary Examiner* — Thomas R Cairns
*Assistant Examiner* — Kai Chang
(74) *Attorney, Agent, or Firm* — Fish & Richardson P.C.

(57) ABSTRACT

A system with a switching device is presented. The switching device includes first ports which interconnect first processing units in a first group using a first protocol and includes second ports which interconnect the first processing units with second processing units amongst second groups using the first protocol in conjunction with a second protocol. The switching device includes a switching fabric which determines a destination of an incoming data unit. If the destination is determined to be a first processing unit in the first group, the switching fabric forwards the data unit to a first port of the first ports using the first protocol. If the destination is determined to be a second processing unit in a second group of the second groups, the switching fabric forwards the data unit to a second port of the second ports using the first protocol in conjunction with the second protocol.

20 Claims, 4 Drawing Sheets

400

RECEIVE DATA UNIT — 410

DETERMINE DESTINATION FOR DATA UNIT — 420

430

DESTINATION IN
FIRST OR SECOND GROUP?

FIRST
GROUP

SECOND
GROUP

GENERATE FIRST
ENCAPSULATED DATA UNIT
USING FIRST PROTOCOL — 440A

GENERATE SECOND
ENCAPSULATED DATA UNIT
USING BOTH FIRST AND
SECOND PROTOCOLS — 440B

FORWARD FIRST
ENCAPSULATED DATA UNIT TO
FIRST PORT — 450A

FORWARD SECOND
ENCAPSULATED DATA UNIT TO
SECOND PORT — 450B

FIG. 4

NETWORK SWITCH FOR INTERCONNECTING COMPUTING DEVICES

TECHNICAL FIELD

The present disclosure generally relates to devices, systems, and methods for interconnecting computing and/or storage devices for data transfer.

BACKGROUND

Artificial intelligence (AI) and machine learning (ML) are methods and techniques for analyzing vast amounts of data to generate a predictive model and then providing the predictive model with new data so it can generate a predicted response. Training and operating these models often requires access to significant processing and memory resources. Such resources can be provided in large server farms and electronic data storage facilities.

SUMMARY

One aspect of the present disclosure relates to a switching device for interconnecting computing devices that are distributed within or across one or more networks. In some implementations, the computing devices include AI processing units, such as AI accelerator devices. The switching device connects one or more AI processing units in a network to one or more other AI processing units in the same network, and/or to one or more AI processing units in a different network.

Aspects of this disclosure include a system which includes a switching device. The switching device includes a plurality of first ports configured to interconnect a plurality of first processing units in a first group using a first protocol. The switching device includes a plurality of second ports configured to interconnect one or more first processing units of the first group with one or more second processing units distributed among a plurality of second groups using the first protocol in conjunction with a second protocol. The switching device includes a switching fabric. The switching fabric is configured to determine a destination of an incoming data unit. The switching fabric is configured to forward the data unit to a first port of the plurality of first ports if the destination is determined to be a first processing unit in the first group, wherein the data unit is transmitted through the first port to the destination using the first protocol. The switching fabric is configured to forward the data unit to a second port of the plurality of second ports if the destination is determined to be a second processing unit in a second group of the plurality of second groups, wherein the data unit is transmitted through the second port to the destination using the first protocol in conjunction with the second protocol.

The plurality of first ports can include N ports and the plurality of second ports can include M ports, wherein N and M are positive integers and wherein N is greater than M. The switching fabric is configured to obtain, from a header field of the incoming data unit, an address corresponding to the destination. The switching fabric includes one or more processors that are configured to determine destinations of incoming data units and to forward the incoming data units to one of the plurality of first ports or one of the plurality of second ports depending on the destination. The switching device can include memory configured to store destination information, and wherein the one or more processors are configured to access the memory to determine a destination. The memory can include a look-up-table having a plurality of entries, each entry including an association of a destination address and one of the first ports or the second ports. The switching fabric can be further configured to receive the incoming data unit from a first processing unit in the first group through a first port of the plurality of first ports.

The switching fabric can be further configured to receive an information unit through a second port of the plurality of second ports, the information unit including a second data unit encapsulated using the first protocol and the second protocol, the second data unit originating from a second processing unit in a second group of the plurality of second groups. The switching fabric can be further configured to remove an encapsulation corresponding to the second protocol from the information unit to obtain the second data unit encapsulated in the first protocol. The switching fabric can be further configured to determine, using the first protocol encapsulation of the second data unit, a second destination for the second data unit, wherein the second destination includes one of the one or more first processing units of the first group. The switching fabric can be further configured to remove the first protocol encapsulation of the second data unit to obtain the second data unit. The switching fabric can be further configured to forward the second data unit to the second destination using a first port of the plurality of first ports that is coupled to the second destination.

The first protocol includes at least one of an Ultra Accelerator Link protocol, PCIe protocol, CXL protocol, or another data transfer protocol. Transmitting the data unit using the first protocol can include formatting the data unit in a format of the first protocol. The second protocol can include at least one of an Ethernet protocol or another data transfer protocol and wherein the first group is connected to each of the plurality of second groups through the second protocol. Transmitting the data unit using the first protocol in conjunction with the second protocol includes formatting the data unit according to the first protocol and encapsulating the formatted data unit as a payload of the second protocol. The switching device can be associated with the first group and one or more of the first group and the plurality of second groups includes a plurality of switching devices. Each of the first processing units and each of the second processing units can be an AI accelerator device. The incoming data unit includes a load instruction or a store instruction for one of the plurality of first processing units or for one of the one or more second processing units.

Another aspect of the present disclosure relates to a method of receiving, through a first port of a plurality of first ports configured to interconnect a plurality of first processing units in a first group using a first protocol, a data unit for sending to a destination. The method includes determining an address of the destination, wherein the destination is one of (i) the plurality of first processing units in the first group, or (ii) one of one or more second processing units distributed among a plurality of second groups that are communicably coupled through a plurality of second ports using the first protocol in conjunction with a second protocol. The method includes, in response to determining that the destination is a first processing unit in the first group, generating a first encapsulated data unit in a format of the first protocol, the first encapsulated data unit including the address of the destination appended to the data unit. The method includes, in response to determining that the destination is a first processing unit in the first group, forwarding the first encapsulated data unit to a first port of the plurality of first ports, wherein the first encapsulated data unit is transmitted through the first port to the first processing unit in the first group using the first protocol. The method includes, in response to determining that the destination is a second processing unit in a second group of the plurality of second groups, generating a second encapsulated data unit in the format of the first protocol and a format of the second protocol, the second encapsulated data unit including the address of the destination appended to the data unit. The method includes, in response to determining that the destination is a second processing unit in a second group of the plurality of second groups, forwarding the second encapsulated data unit to a second port of the plurality of second ports, wherein the second encapsulated data unit is transmitted through the second port to the second group using the second protocol.

Another aspect of the present disclosure relates to a non-transitory computer-readable medium storing instructions that, when executed, cause one or more processors to perform any of the foregoing operations.

BRIEF DESCRIPTION OF THE FIGURES

FIG. 4 illustrates a flow chart of a process for transmitting data using the switching device.

DETAILED DESCRIPTION

Figure 1:
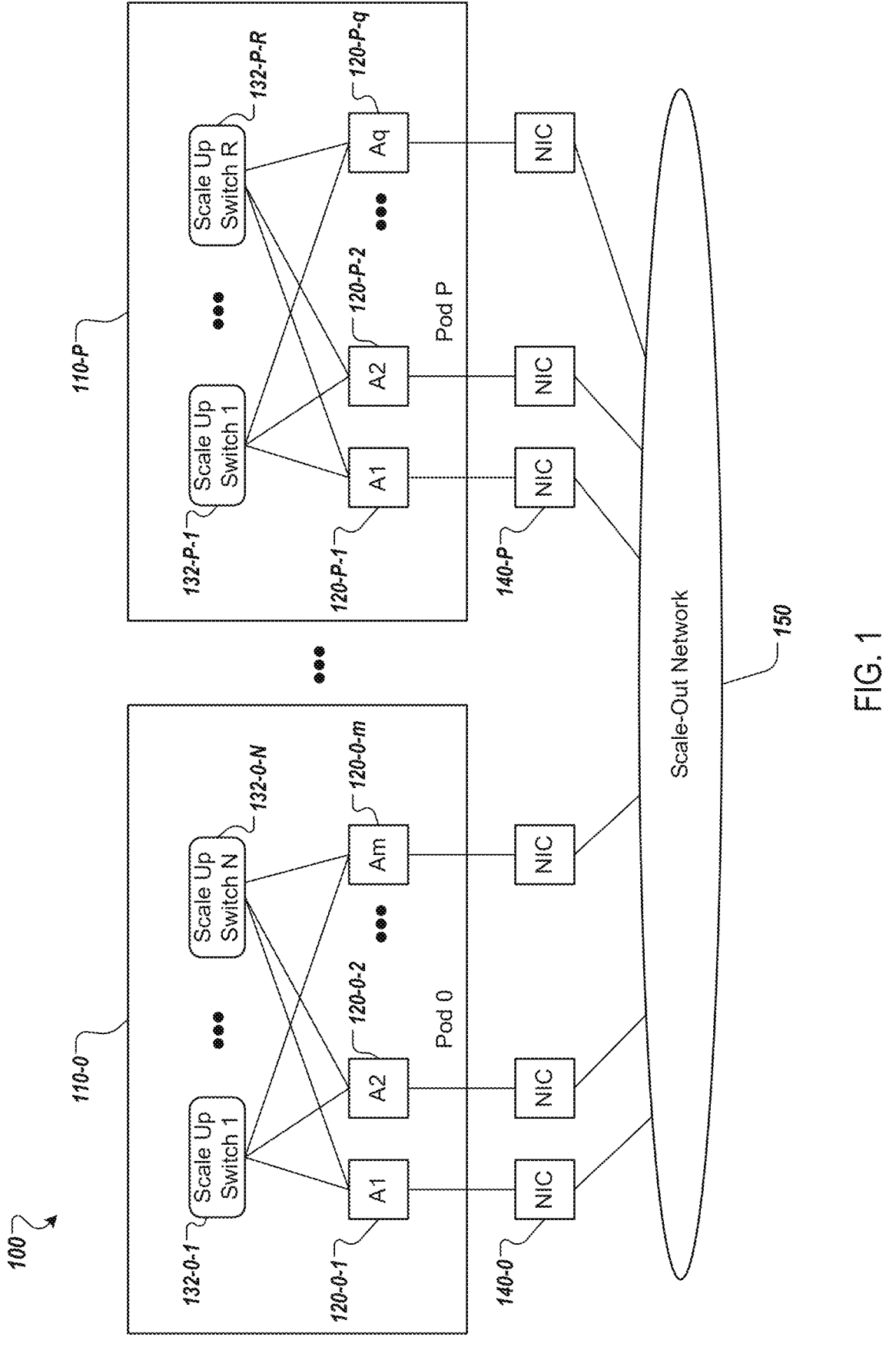
FIG. 1 illustrates a schematic diagram of a conventional system for providing network communications amongst processing units.

An AI system can utilize a plurality of computing devices working in tandem to perform high-volume data processing operations, such as data analysis, storage and retrieval operations. The computing devices can be AI accelerator devices, for example graphical processing units (GPUs) or other suitable processing units. In some cases, an AI system can be configured with two or more pods (which are also referred to as clusters), where each pod includes a plurality of accelerators in a network. In a conventional AI system, accelerators within the same local pod are interconnected using scale-up switches that are present in the cluster, while connection with external accelerators in other pods or clusters of the AI system are over a scale-out Ethernet network that is accessible using network interface cards (NICs) coupled to the accelerators. In this conventional arrangement, an accelerator can directly access the memory of another local accelerator (e.g., within the same pod) through a local scale-up switch with high throughput and low latency. This communication uses a push model where data from one accelerator to another local accelerator is pushed directly. In contrast, to communicate with an external accelerator in another pod of the AI system, data from the accelerator memory is pulled by the corresponding NIC coupled to the accelerator and transmitted over the Ethernet (ETH) network to the destination pod.

In some implementations, one or more switching devices that are each configured with different types of ports supporting multiple protocols is used to interconnect AI accelerators within a pod, and connect to AI accelerators in other pods over Ethernet. One such switching device is configured to include one or more of a first type of ports (e.g., Ultra Accelerator Link (UAL)-only ports) for interconnecting AI accelerators within a local pod, and one or more of a second type of ports (e.g., Ethernet/UAL ports) to consolidate data transmission to AI accelerators in remote pods via an Ethernet network, while still permitting efficient data transfers within the pod using the first type of ports.

These switching devices with different types of ports for intra- and inter-pod data transfer can be used to replace local scale-up switches and scale-out NICs used in conventional AI systems, which can reduce the amount of hardware and associated connections. This can improve the operating efficiency of an AI system, or a similar server farm or a data collection and storage service, by helping to manage data transfer from one location to another location in a more efficient manner while also decreasing latency.

In this context, an AI accelerator or a similar processing unit is a specialized hardware or software component designed to enhance the performance and efficiency of artificial intelligence and machine learning applications. These processing units are optimized for the unique computational requirements of AI tasks, such as deep learning and neural network processing.

In an example, an accelerator can be used with high bandwidth memory (HBM). HBM is a specialized type of memory designed to enhance the performance of accelerators and other high-performance computing systems. In some cases, the switching devices as described herein are used to transfer data between the memory (e.g., HBMs) associated with the AI accelerators, e.g., using load/store operations.

In some cases, data transfer protocols within a pod is based on remote direct memory access (RDMA). Data transfer across pods utilize RDMA over Converged Ethernet (ROCE), which enables remote access to memory over Ethernet networks.

Scale-up and scale-out bandwidths for accelerators refer to the networking capabilities required to support different levels of AI infrastructure expansion. Scale-up bandwidth focuses on high-speed connections within a single server or a small cluster of processing units, such as AI accelerators that are local to a pod. As an example, scale-up includes ultra-low latency (e.g., <1 μs), guaranteed bandwidth (e.g., 6.4 Tbps per device), direct load/store memory access, and connects up to a large number (e.g., $2^{10}$=1024 accelerators) within a single pod. Scale-out bandwidth addresses communication across pods with larger clusters of processing units with low latency (e.g., <10 μs) and high bandwidth (e.g., 800 Gbps per accelerator or per processor). For each AI accelerator, the scale up bandwidth traditionally is ~8 times the scale out bandwidth. Within the scale-up domain, accesses are simple load and store instructions of cache lines. These are generally small up to 256 byte accesses.

In the context of accelerators for AI systems and other suitable high-performance networking, UAL (Ultra Accelerator Link) transactions refer to the data transfer operations that occur between processing units within a UALink network and employing a UAL protocol. In some cases, this is used for communication within a pod. UALink is designed to facilitate efficient, high-speed communication between processing units, enabling them to work together as a cohesive unit. As described in greater detail in the following sections, in some implementations, communication between accelerators in different pods use UAL over Ethernet. Other network communication protocols exist and may also be used within the context of the present disclosure.

In the following sections, the novel switching devices of the present disclosure are described in the context of AI systems. However, such switching devices can also be used for other high-performance computing systems, e.g., where pluralities of processing units are distributed across clusters or pods, with the processing units within a pod being interconnected using the switching devices for memory load/store operations, while the switching devices are also used to connect different pods through an external network (e.g., an Ethernet network).

FIG. 1 illustrates a schematic diagram of a conventional system 100 for providing network communications amongst processing units. The conventional system 100 includes a plurality of processing units, conventional switches, and network interface cards distributed across a plurality of pods. In the example system 100 depicted in the figure, multiple pods 110-0, . . . 110-P are illustrated. Each pod can have multiple conventional switches and multiple processing units. For example, pod 110-0 comprises multiple processing units A1, A2, . . . , Am, which are labeled respectively as 120-0-1, 120-0-2, . . . 120-0-$m$ (and each referred to generically as a processing unit 120) that are interconnected by switches 132-0-1, . . . 132-0-N (each switch referred to generically as a switch 132). Pod 110-P comprises multiple processing units A1, A2, . . . , Aq, which are labeled respectively as 120-P-1, 120-P-2, . . . 120-P-q (and each referred to generically as processing unit 120) that are interconnected by switches 132-P-1, . . . 132-P-N. In the example illustrated, pod 110-0 has N switches and m processing units and pod has R switches and q processing units. As shown, each of the switches 132 in the system is a scale up switch. In some cases, different pods have the same number of processing units (e.g., m=q) and/or the same number of switches (e.g., N=R). In some cases, different pods have different numbers of processing units (e.g., m≠q) and/or different numbers of switches (e.g., N≠R). A processing unit 120 includes at least a processor and memory or storage. The system 100 represents a conventional AI system, in which each processing unit functions as an AI accelerator. As shown, each of the switches 132 in the system 100 is a scale up switch. In the conventional system 100, each processing unit 120 is also connected to a separate network interface card (NIC). For example, processing units 120-0-1, 120-0-2, . . . 120-0-$m$ in pod 110-0 are connected to respective NICs 140-0, while processing units 120-P-1, 120-P-2, . . . 120-P-q in pod 110-P are connected to respective NICs 140-P. In some cases, a pod may represent one rack of a server facility, or one sub-division of one rack (e.g., one shelf, or a portion of a shelf) in a server facility.

In the conventional system 100, data transfer within a pod occurs over the conventional scale up switches 132 within the pod and data transfer external to the pod occurs through NICs 140. Each processing unit, for example a first processing unit A1 120-0-1, a second processing unit A2 120-0-2, . . . , and an m-th processing unit Am 120-0-$m$ of pod 110-0 are each connected individually to each of the switches 132 within pod 110-0, forming an interconnected intra-pod network. Pod 110-0 may have N conventional switches 132-0-1 to 132-0-N. These conventional switches 132-0 enable transfers of data amongst processing units within pod 110-0. In an example a conventional switch 132 includes a crossbar switch for connecting any of the first processing unit 120-0-1 through the m-th processing unit 120-0-$m$ with any of the other processing units within pod 110-0. In some cases, each of the switches 132 in pod 110-0 has m ports to individually connect the m accelerators in the pod; each of the accelerators 120-0-1 . . . 120-0-$m$ has N interfaces to connect to each of the N switches 132. In a similar manner, each of the switches 132 in pod 110-P has q ports to individually connect the q accelerators in the pod;

each of the accelerators 120-P-1 . . . 120-P-q has R interfaces to connect to each of the R switches 132 in the pod. Each of the processing units in a pod is connected to network 150 through a respective network interface card (NIC), to communicate with processing units in other pods. For example, processing unit 120-0-1 in pod 110-0 can exchange data with processing unit 120-P-1 in pod 110-P through a connection established using NIC 140-0 coupled to processing unit 120-0-1, over the network 150 and through NIC-140-P coupled to processing unit 120-P-1. In some cases, the network 150 is a scale-out Ethernet network. In this conventional system, each accelerator in a pod uses a NIC 140 to transmit and/or receive data from processing units in different pods.

Figure 2:
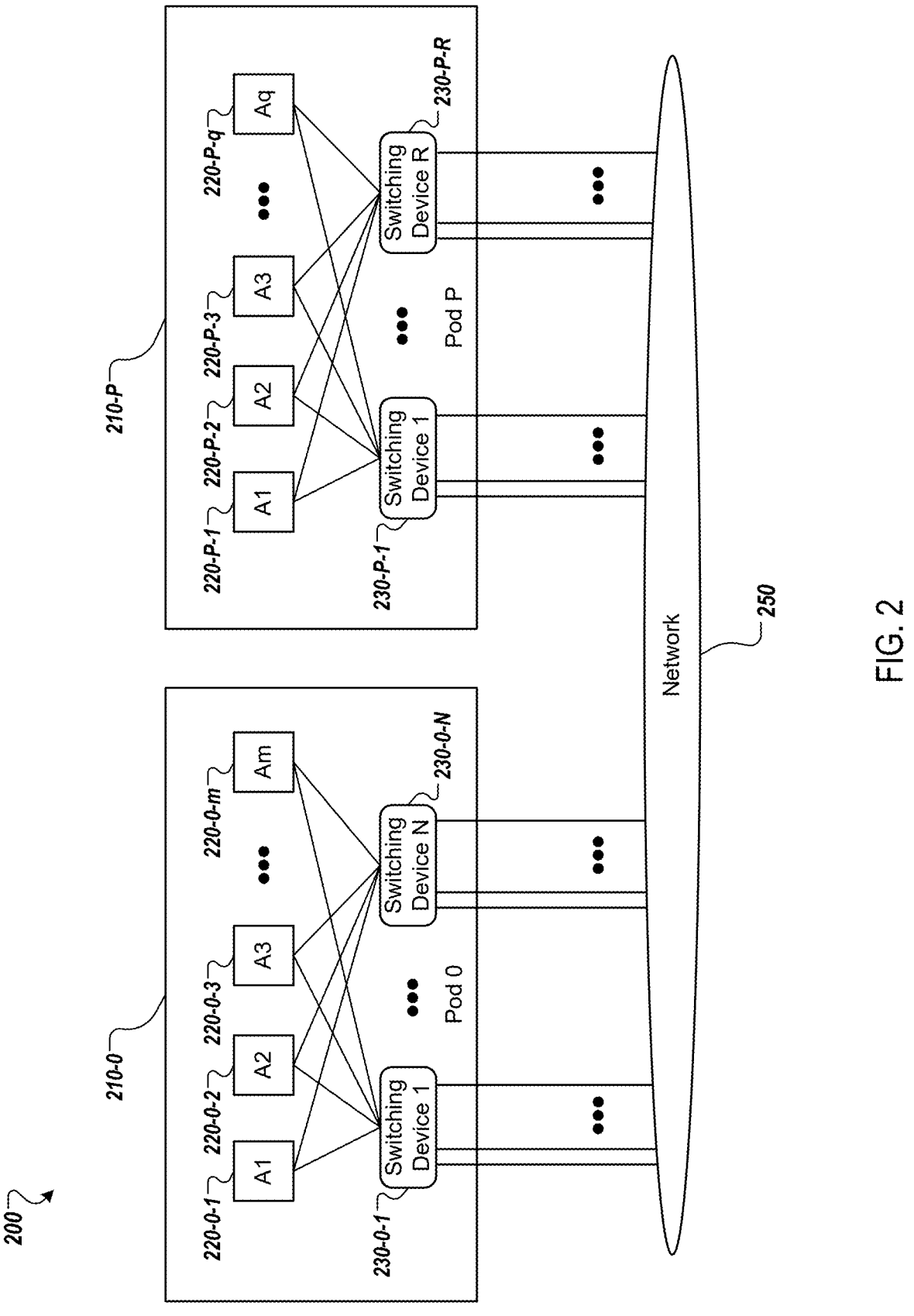
FIG. 2 is a schematic diagram of an example system with a switching device for providing network communications amongst processing units.

FIG. 2 is a schematic diagram of an example system 200 with a switching device for providing network communications amongst processing units, according to one or more implementations. The system 200 of processing units includes a plurality of pods 210-0, . . . , 210-P, each of which includes one or more processing units and switching devices. For example, pod 210-0 comprises multiple processing units A1, A2, . . . , Am, which are labeled respectively as 220-0-1, 220-0-2, 220-0-3, . . . 220-0-$m$ that are interconnected by switching devices 230-0-1, . . . 230-0-N (each referred to generically as switching device 230); pod 210-P comprises multiple processing units A1, A2, . . . , Aq, which are labeled respectively as 220-P-1, 220-P-2, 220-P-3, . . . 220-P-q (each referred to generically as processing unit 220) that are interconnected by switching devices 230-P-1, . . . 230-P-R. Each of the processing units in the system 200 is referred to generically as processing unit 220, while each of the switching devices is referred to generically as switching device 230. A processing unit 220 includes at least a processor and memory or storage. In some implementations, the system 200 is an AI system in which each processing unit 220 is an AI accelerator. As shown, each of the switching devices 230 in the system 200 comprises a switching fabric. In some implementations, different pods have the same number of processing units (e.g., m=q) and/or the same number of switching devices (e.g., N=R). In some implementations, different pods have different numbers of processing units (e.g., m≠q) and/or different numbers of switching devices (e.g., N≠R).

In the system 200, data transfer between accelerators within a pod, and data transfer between accelerators in different pods, both occur using the switching devices 230. Each processing unit, for example processing units 220-0-1, 220-0-2, . . . , 220-0-$m$ of pod 210-0 are each connected individually to each of the switching devices 230 within pod 210-0, with there being N switching devices 230-0-1 to 230-0-N in the pod. Each of the switching devices 230 in pod 210-0 has m ports to individually connect the m accelerators in the pod; each of the accelerators 220 has N interfaces to connect to each of the N switching devices 230. In a similar manner, each of the switching devices 230 in pod 210-P has q ports to individually connect the q accelerators in the pod; while each of the accelerators in pod 210-P has R interfaces to connect to each of the R switching devices in the pod. Each of the switching devices 230 is also connected to network 250, through which different pods to communicate with one another. In some cases, the network 250 is a scale-out Ethernet network.

Each of the switching devices 230 enable transfers of data amongst processing units within a respective local pod, and also among processing units in different pods. For example, switching device 230-0-1 in pod 210-0 can connect processing unit 220-0-1 to any of processing units 220-0-2, 220-0-3, . . . , 220-0-*m* in the local pod through its switching fabric using a first type of port. Switching device 230-0-1 can also connect processing unit 220-0-1 to any of processing units 220-P-1, 220-P-2, 220-P-3, . . . , 220-P-q in remote pod 210-P through its switching fabric using a second type of port, through a connection established over the network 250 and one of switching devices 230-P-1, . . . , 230-P-R that is coupled to the target processing unit in pod 210-P. Accordingly, a switching device 230 performs the function of both a scale up switch (e.g., switch 132) and a NIC (e.g., NIC 140). Using a switching device 230 eliminates the need to use one NIC attached to each processing unit for pod-to-pod data transfer, reducing the amount of hardware and connections that are used in the system 200 compared to the system 100.

Figure 3:
FIG. 3 illustrates a schematic diagram of a switching device.
Figure 3:
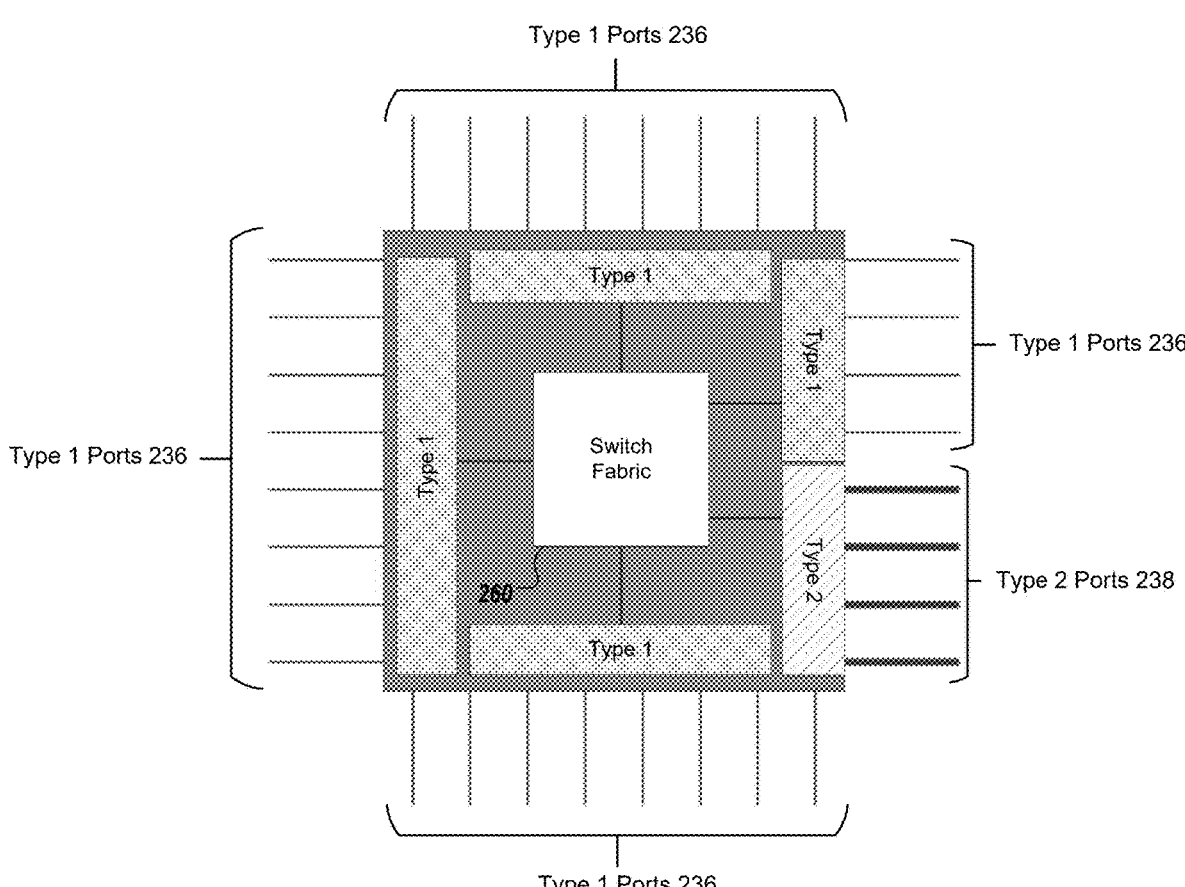

FIG. 3 illustrates a schematic diagram of an example switching device 230, according to one or more implementations. In some implementations, the schematic diagram of FIG. 3 shows the structure of the switching fabric of each of switching devices 230-0-1, . . . 230-0-N, 230-P-1 . . . 230-P-R. The switching device 230 includes a first type of ports and a second type of ports. In some implementations, the first type of ports (Type 1 ports 236) are UAL ports and the second type of ports (Type 2 Ports 238) are UAL over Ethernet (ETH/UAL) ports. In the illustrated example there are 28 Type 1 ports and 4 Type 2 ports, which results in a ratio of Type 2 ports to Type 1 ports to be 4/28 or 1:7. This value is just an example, and the ratio of the Type 2 ports to the Type 1 ports can be a different positive rational number. As an example, in some cases, there can be 1024 ports of the switching device 230, with 64 Type 2 ports and 960 Type 1 ports, such that the ratio of Type 2 ports 238 to Type 1 ports 236 is 1:15. As another example, there can be 500 total ports on the switching device 230 with 50 Type 2 ports and 450 Type 1 ports, and the ratio is and the ratio is 1:9. Generally, each switching device 230 in a pod (e.g., pod 210-0) can be represented as having Z Type 1 ports 236 for switching within the pod, and L Type 2 ports 238 for switching to processing units in other pods over the network 250 (where L, Z are integers >0). The ratio of Type 2 ports 238 to Type 1 ports 236 can be generally noted as L/Z. In some implementations, L=Z/8 for a ratio Type 2 ports to Type 1 ports of 1:8.

The switching device also includes a switching fabric or crossbar 260. The switching fabric or crossbar 260 may be an electronic switch, an optical switch an electro-optical switch, or some other suitable switching fabric. The switching fabric or crossbar 260 can connect any of its ports with any of its other ports. The switching fabric can receive an incoming data unit from a processing unit in the local pod through a first port of the plurality of first ports. The incoming data unit can include a load instruction or a store instruction for another of the plurality of processing units in the local pod, or for a processing unit in a remote pod.

The switching fabric 260 uses UAL-ports 236 to switch direct data packets from a first processing unit within the pod to another processing unit within the same pod. For example, switching device 230-0-1 in pod 210-0 can connect processing unit 220-0-1 to any of processing units 220-0-2, 220-0-3, . . . , 220-0-*m* in the pod 210-0 through its switching fabric using incoming Type 1 port 236 and also outgoing Type 1 port 236. The switching fabric 260 uses Type 2 ports 238 to connect to a processing unit of a remote pod through the network 250 and through a second switching device located in the remote pod. For example, switching device 230-0-1 can connect processing unit 220-0-1 to processing unit 220-P-1 in remote pod 210-P through its switching fabric using (i) an Type 1 port 236 coupled to processing unit 220-0-1, and (ii) one of Type 2 ports 238 to connect to one of switching devices, e.g., switching device 230-P-1, in pod 210-P. The switching device 230-P-1, in turn, uses one of its UAL/ETH ports 238 for this connection over network 250, and one of its Type 1 ports 236 to complete the connection to the processing unit 220-P-1.

In some implementations, a data unit is formatted following a data transfer protocol before it is switched. For example, in some cases, data that is switched between processing units within the same pod are formatted using UAL data format. In some cases, to forward data to a processing unit in a remote pod, data units are first formatted according to the first protocol and then the formatted data units are encapsulated as payload of the second protocol. For example, the data unit is first formatted using UAL format, and then the UAL-formatted data unit is encapsulated in an Ethernet packet. In some implementations, other data transfer protocols can be used, e.g., Peripheral Component Interconnect Express (PCIe), Compute Express Link (CXL) or NVLink, among others. The load store operations from Type 1 port to Type 1 port can be switched with low latency local to the pod. The UAL transactions to a remote pod are carried over the Type 2 ports by packing multiple consecutive transactions going to the same processing unit into a single packet. The transactions are packed into ethernet packets as they go out on Type 2 ports and unpacked into UAL load/store transactions as they are received from Ethernet before switching through the switching fabric. The switching devices 230 need to observe the latency differences within and across the pods and distribute the load accordingly. This load distribution can remove the need for back-end NICs. As the processing units are pushing the data, they will be active during the communication phase. Processing units with hardware offloads to push the data can benefit by combining computations and communications at the same time.

In some implementations, to switch data within a pod or across pods, the switching device 230 is configured to determine, based on a data packet header or packet metadata, a destination of incoming data. The switching device 230 then routes the data to the appropriate destination processing unit which may be in the same pod or a different pod using either an Type 1 port or Type 2 port, as described in the preceding section. In some implementations, the switching device 230 includes storage memory for storing destination information and one or more processors to access the data in memory to determine a destination. In some implementations, the processor and memory for controlling the switching device 230 are located external to, and communicably coupled to, the switching device 230. In some implementations, the destination information is stored in lookup tables in the memory, or some other suitable data structure. For example, a look-up-table can have a plurality of entries, each entry comprising an association of a destination (e.g., a destination address) and one of the first type of ports (e.g., UAL ports) or the second type of ports (e.g., ETH/UAL ports) of the switching device.

In some implementations, the destination address can include a unique identifier for a processing unit, which identifies each processing unit in the system, across the plurality of pods. In such implementations, the total number of processing units in the system (e.g., system 200) is limited by the number of bits available in a header or meta-data for such destination information. In an example, the number of bits in a header reserved for the destination is 11, such that the total number of processing units available is 2048. In contrast, in the conventional system 100, processing units are identified differently, for example by an identifier that includes information about the pod and also information about the processing unit within the pod. In the conventional system, a NIC connected to the data source sends data addressed to the destination pod, and a NIC in the destination pod identifies the destination processing unit within that pod. By identifying each processing unit uniquely in the system 200, the switching device 230 can transfer data without referencing the pod to which the processing units belong. This can enable faster switching of data in the system 200, compared to the conventional system 100.

In some implementations of the system 200, the destination information can include pod identifier in the data header or metadata. In such implementations, the switching device 230 is configured to transmit data units to the destination pod based on the identifier of the pod, and the data is then forwarded to the destination processing unit based on the identifier of the processing unit within its local pod.

In some implementations of the switch 230, the Type 1 ports 236 are formed on a first chiplet and the Type 2 ports are formed on a second chiplet 238. The first and second chiplets may be co-located on a substrate or package.

FIG. 4 illustrates a flow chart of a process 400 for transmitting data using the switching device. In some implementations, the process 400 is performed by a switching device 230 to transfer data between processing units within a pod, or across different pods. For example, the process 400 can be performed by any of switching devices 230-0-1, 230-0-N, 230-P-1, or 230-P-R. In some implementations, the process 400 is performed by one or more processors of a switching device 230. The one or more processors can execute instructions stored in memory of the switching device 230 to perform the process 400. If the destination is in the first group of AI processors, encapsulated data is generated using the first protocol (440A) and the encapsulated data is forwarded to the first port (450A). If the data's destination is in the second group of AI processors, the encapsulated data is generated using both the first and the second protocols (440B) and the encapsulated data is forwarded to the second port (450B).

In the process 400, a switching device receives a data unit (410). The data unit includes data and a destination for the data. In an example, the destination can be a processing unit within a local pod (e.g., within the pod in which the data transfer originates). In an example, the destination can be a processing unit in a remote pod (e.g., in a pod that is different from the pod in which the data transfer originates). In an example, the destination can be designated by a device identifier or by multiple device identifiers. In some implementations, the destination comprises multiple destinations. In some implementations, the destination is a single accelerator unit. The switching device can receive a data unit for sending to a destination through a first port of a plurality of first ports which interconnect a plurality of first processing units in a first group using a first protocol.

The switching device 230 reads the data unit and determines the destination (420). In an example, the data unit has a header and a payload. The header includes an address for the destination and the payload includes the data to be transferred. In an example, the destination can be a unique device identifier of the processing unit to which the data are to be transferred. Based on the header information, the switching device can determine an address of the destination.

The switching device determines whether the destination is in a first group or a second group (430). For example, the destination can be a processing unit in the local pod, or a processing unit in a remote pod. In some implementations, each processing unit is associated with a pod and the association is stored in memory or storage (e.g., in a look-up table) associated with the switching device. Once the destination has been determined, the switching device 230 can access the look-up table in memory to determine whether the destination processing unit is part of the local pod or part of a remote pod.

If the destination of the data is a processing unit within the first group, the switching device 230 generates a first encapsulated data unit using the first protocol (440A). For example, if the destination is a processing unit in the local pod, the switching device 230 uses UAL protocol to format and forward the data. In some implementations, the switching device 230 generates a first encapsulated data unit by formatting the data unit in the UAL format.

The switching device 230 then forwards the first encapsulated data to a first port (450A). For example, the switching device 230 controls the switching fabric 260 to forward the first encapsulated data to the destination with the local pod through one of the Type 1 ports 236.

If the destination of the data is a processing unit in the second group, then the switching device 230 generates a second encapsulated data unit using both the first protocol and the second protocol (440B). For example, if the destination is a processing unit in the remote pod, the switching device 230 uses UAL over Ethernet to forward the data to the remote pod over the network 250. In an example, the data is encapsulated first by the UAL protocol and then the UAL data unit is encapsulated using Ethernet protocol. In an example, separate data units encapsulated using the first protocol (e.g., UAL) may be packed together for transmission using the second protocol (e.g., as an Ethernet packet). As described previously, in some implementations, generating a second encapsulated data using both the first protocol and the second protocol can include formatting the data in a format of the first protocol including the destination address appended to the data unit and then encapsulating the formatted data unit in a second encapsulation of the second protocol.

The switching device then forwards the second encapsulated data to a second port (450B). For example, the switching device 230 controls the switching fabric 260 to forward the second encapsulated data to the destination in the second pod through one of the Type 2 ports 238.

In some implementations, one Ethernet packet can pack multiple UAL data packets, e.g., when all these UAL data packets are all destined for processing units in the same remote pod. For example, processing units 220-0-1, 220-0-2 and 220-0-3 of the pod 210-0 can send data to one or more processing units of the pod 210-P, such as one or more of processing units 220-P-1, 220-P-2, 220-P-3 and 220-P-q. The three processing units 220-0-1, 220-0-2 and 220-0-3 send their respective data along with the destination information to one of switching devices 230-0-1 and 230-0-N in the pod 210-0. The switching device receives the data through Type 1 ports 236 that couple to the processing units, combines the three data packets (formatted as UAL data) and encapsulates them into a single Ethernet data packet, which is transmitted through one of the Type 2 ports 238 over the network 250 to the pod 210-P.

One of the switching devices 230-P-1, . . . , 230-P-R in the pod 210-P receives the Ethernet packet from the network 250 through one of its UAL/ETH ports 238. The switching device unpacks the encapsulated UAL data units and determines the destination processing unit(s) within the pod for these data units (e.g., one or more of processing units 220-P-1, 220-P-2, 220-P-3 and 220-P-q). Upon determining the destination, the switching device forwards the data units to their respective destination processing unit(s) through one or more Type 1 ports 236 that are coupled to the respective destination processing units.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

While the present disclosure describes many examples, these should not be construed as limitations on the scope of an invention that is claimed or of what may be claimed, but rather as descriptions of features specific to particular embodiments. Certain features that are described in the context of separate embodiments can also be implemented in combination in a single embodiment. Conversely, various features that are described in the context of a single embodiment can also be implemented in multiple embodiments separately or in any suitable sub-combination. Although some features may be described as acting in certain combinations and even initially claimed as such, one or more features from a claimed combination in some cases can be excised from the combination, and the claimed combination may be directed to a sub-combination or a variation of a sub-combination. Similarly, while some operations may be depicted in the drawings in a particular order, this should not be understood as requiring that such operations are performed in the particular order shown or in sequential order, or that all illustrated operations be performed, to achieve desirable results.

A number of embodiments have been described. Nevertheless, it is understood that various modifications can be made without departing from the spirit and scope of the present disclosure. Accordingly, other embodiments are within the scope of the following claims.

We claim:

1. A system comprising:
a switching device comprising:
a plurality of first ports configured to interconnect a plurality of first processing units in a first group using a first protocol, wherein the plurality of first processing units in the first group are within a cluster,

a plurality of second ports configured to interconnect one or more first processing units of the first group with one or more second processing units distributed among a plurality of second groups using the first protocol in conjunction with a second protocol, wherein the one or more second processing units of the plurality of second groups are remote from the cluster corresponding to the first group, and
a switching fabric configured to:
determine a destination of an incoming data unit;
forward the data unit to a first port of the plurality of first ports if the destination is determined to be a first processing unit in the first group, wherein the data unit is transmitted through the first port to the destination using the first protocol; and
forward the data unit to a second port of the plurality of second ports if the destination is determined to be a second processing unit in a second group of the plurality of second groups, wherein the data unit is transmitted through the second port to the destination using the first protocol in conjunction with the second protocol.

2. The system of claim 1, wherein the plurality of first ports comprises N ports and the plurality of second ports comprises M ports, wherein N and M are positive integers and wherein N is greater than M.

3. The system of claim 1, wherein determining the destination of the incoming data unit comprises:
obtaining, from a header field of the incoming data unit, an address corresponding to the destination.

4. The system of claim 1, wherein the switching fabric comprises one or more processors that are configured to:
determine destinations of incoming data units; and
forward the incoming data units to one of the plurality of first ports or one of the plurality of second ports depending on the destination.

5. The system of claim 4, wherein the switching device comprises a memory configured to store destination information, and wherein the one or more processors are configured to access the memory to determine a destination.

6. The system of claim 5, wherein the memory comprises a look-up-table having a plurality of entries, each entry comprising an association of a destination address and one of the first ports or the second ports.

7. The system of claim 1, wherein the switching fabric is further configured to:
receive the incoming data unit from a first processing unit in the first group through a first port of the plurality of first ports.

8. The system of claim 1, wherein the switching fabric is further configured to:
receive an information unit through a second port of the plurality of second ports, the information unit comprising a second data unit encapsulated using the first protocol and the second protocol, the second data unit originating from a second processing unit in a second group of the plurality of second groups;
remove an encapsulation corresponding to the second protocol from the information unit to obtain the second data unit encapsulated in the first protocol;
determine, using the first protocol encapsulation of the second data unit, a second destination for the second data unit, wherein the second destination comprises one of the one or more first processing units of the first group;
remove the first protocol encapsulation of the second data unit to obtain the second data unit; and forward the second data unit to the second destination using a first port of the plurality of first ports that is coupled to the second destination.

9. The system of claim 1, wherein the first protocol comprises at least one of an Ultra Accelerator Link protocol, PCIe protocol, CXL protocol, or another data transfer protocol.

10. The system of claim 1, wherein transmitting the data unit using the first protocol comprises formatting the data unit in a format of the first protocol.

11. The system of claim 1, wherein the second protocol comprises at least one of an Ethernet protocol or another data transfer protocol and wherein the first group is connected to each of the plurality of second groups through the second protocol.

12. The system of claim 1, wherein transmitting the data unit using the first protocol in conjunction with the second protocol comprises formatting the data unit according to the first protocol and encapsulating the formatted data unit as a payload of the second protocol.

13. The system of claim 1, wherein the switching device is associated with the first group and one or more of the first group and the plurality of second groups comprise a plurality of switching devices.

14. The system of claim 1, wherein the incoming data unit comprises a load instruction or a store instruction for one of the plurality of first processing units or for one of the one or more second processing units.

15. A method comprising:

receiving, through a first port of a plurality of first ports configured to interconnect a plurality of first processing units in a first group using a first protocol, a data unit for sending to a destination, wherein the plurality of first processing units in the first group are within a cluster;

determining an address of the destination, wherein the destination is one of (i) the plurality of first processing units in the first group, or (ii) one of one or more second processing units distributed among a plurality of second groups that are communicably coupled through a plurality of second ports using the first protocol in conjunction with a second protocol, wherein the one or more second processing units of the plurality of second groups are remote from the cluster corresponding to the first group;

in response to determining that the destination is a first processing unit in the first group:

generating a first encapsulated data unit in a format of the first protocol, the first encapsulated data unit comprising the address of the destination appended to the data unit, and forwarding the first encapsulated data unit to a first port of the plurality of first ports, wherein the first encapsulated data unit is transmitted through the first port to the first processing unit in the first group using the first protocol; and in response to determining that the destination is a second processing unit in a second group of the plurality of second groups:

generating a second encapsulated data unit in the format of the first protocol and a format of the second protocol, the second encapsulated data unit comprising the address of the destination appended to the data unit, and forwarding the second encapsulated data unit to a second port of the plurality of second ports, wherein the second encapsulated data unit is transmitted through the second port to the second group using the second protocol.

16. The method of claim 15, in response to determining that the destination is the second processing unit in the second group of the plurality of second groups, further comprising:

transmitting the data unit from a first memory location of the first processing unit to a switching fabric by an Ultra Accelerator Link (UAL) port; and transmitting the data unit from the switching fabric to the destination by an Ethernet port.

17. The method of claim 15, wherein the address of the destination comprises a second group, a selected processing unit within the second group, and a selected memory location associated with the selected processing unit.

18. The method of claim 15, wherein generating the first encapsulated data unit in the format of the first protocol comprises formatting the data unit in the format of the first protocol.

19. The method of claim 15, wherein generating a second encapsulated data unit in the format of the first protocol and a format of the second protocol comprises formatting the data unit in a format of the first protocol including the address of the destination appended to the data unit and encapsulating the formatted data unit in a second encapsulation of the second protocol.

20. The method of claim 15, further comprising, in response to determining that the destination is a second processing unit in a second group of the plurality of second groups:

forwarding, upon receipt of the encapsulated data unit by the second group, the second encapsulated data unit to the second processing unit.

* * * * *